United States Patent
Yamada et al.

(10) Patent No.: US 8,296,768 B2
(45) Date of Patent: Oct. 23, 2012

(54) METHOD AND APPARATUS TO ENABLE RUNTIME PROCESSOR MIGRATION WITH OPERATING SYSTEM ASSISTANCE

(75) Inventors: Koichi Yamada, Los Gatos, CA (US); Douglas E. Covelli, Cambridge, MA (US); Jose A. Vargas, Rescue, CA (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1261 days.

(21) Appl. No.: 11/772,155

(22) Filed: Jun. 30, 2007

(65) Prior Publication Data

US 2009/0007121 A1    Jan. 1, 2009

(51) Int. Cl.
*G06F 9/46* (2006.01)
*G06F 11/00* (2006.01)

(52) U.S. Cl. .................. 718/102; 718/108; 714/13
(58) Field of Classification Search .................. None
See application file for complete search history.

(56) References Cited

U.S. PATENT DOCUMENTS

| | | | | |
|---|---|---|---|---|
| 5,235,700 | A | * | 8/1993 | Alaiwan et al. .................. 714/13 |
| 5,339,437 | A | * | 8/1994 | Yuen .............................. 710/261 |
| 2002/0016863 | A1 | | 2/2002 | Lurndal |
| 2005/0172164 | A1 | * | 8/2005 | Fox et al. ......................... 714/13 |
| 2007/0150488 | A1 | * | 6/2007 | Barsness et al. ............... 707/100 |
| 2007/0226411 | A1 | * | 9/2007 | Ehrlich et al. ................. 711/113 |

OTHER PUBLICATIONS

Thomas Wolfgang Burger, "Methods to Utilize Intel's Hyper-Threading Technology with Linux" from http://www3.intel.com/cd/ids/developer/asmo-na/eng/20354.htm?page=4.

"Intel® Processor identification and the CPUID Instructon: Application Note 485" from http://download.intel.com/design/Xeon/applnots/24161831.pdf; Sep. 2006.

Fumio Aono, NEC Corporation, "Designing Highly Scalable Systems for the Itanium Processor," Fall 2000, (NEC AzuSA.pdf).

Sun Microsystems, Inc., "Sun Enterprise 10000 Server: Dynamic System Domains," Feb. 1999 (SUN-domainswp.pdf).

* cited by examiner

*Primary Examiner* — Camquy Truong
(74) *Attorney, Agent, or Firm* — Caven & Aghevli LLC (57) ABSTRACT

In a method for switching to a spare processor during runtime, a processing system determines that execution should be migrated off of an active processor. An operating system (OS) scheduler and at least one device are then paused, and the active processor is put into an idle state. State data from writable and substantial non-writable stores in the active processor is loaded into the spare processor. Interrupt routing table logic for the processing system is dynamically reprogrammed to direct external interrupts to the spare processor. The active processor may then be off-lined, and the device and OS scheduler may be unpaused or resumed. Threads may then be dispatched to the spare processor for execution. Other embodiments are described and claimed.

23 Claims, 3 Drawing Sheets

METHOD AND APPARATUS TO ENABLE RUNTIME PROCESSOR MIGRATION WITH OPERATING SYSTEM ASSISTANCE

FIELD OF THE INVENTION

The present disclosure relates generally to the field of data processing, and more particularly to methods and related apparatus for supporting runtime migration of processors and/or memory modules.

BACKGROUND

Runtime replacement of processors and runtime replacement of memory modules are two of the key innovative features envisioned in high-end server systems for supporting reliability, availability, and serviceability (RAS). When a processing system supports runtime replacement of processors and memory modules, a faulty processor or memory module can be replaced without shutting down the system. However, it may not be possible to implement runtime replacement of processors and memory modules without providing many different software components in the processing system with special control logic for supporting such functionality. For instance, special control logic may be needed in the applications, in the operating system (OS), and in the device drivers.

When all of the hardware and software for a computer system is built by the same company, that company may be said to provide a vertical solution. Specifically, for purposes of this disclosure, the term "vertical solution" denotes a high-end server with a proprietary OS and vertical device driver and application development environments that are controlled from top to bottom by a single company. A small number of companies may currently build vertical solutions which include the necessary hardware and software features to enable runtime replacement of processors and memory modules. Those companies may include International Business Machines Corp. (IBM), the Hewlett-Packard Company (HP), Sun Microsystems, Inc. (Sun), and NEC Corp. (NEC). However, such a vertical solution is proprietary by nature and does not translate to the horizontal market.

A horizontal solution for this problem needs to run on standard high-volume sewers which use an OS that was designed with standardized interfaces for use in a wide range of platforms. For purposes of this disclosure, an OS that features standardized interfaces for use in a wide range of platforms may be referred to as a shrink-wrapped OS. For example, the various OSs sold by Microsoft Corp. under the Windows trademark are considered shrink-wrapped OSs. The OSs sold by Red Hat, Inc. under the Linux trademark may also be considered shrink-wrapped OSs. For a shrink-wrapped OS, the binaries work with different platforms. Consequently, shrink-wrapped OSs need standardized interfaces, so drivers can be written by parties other than company that wrote the OS.

However, when a data processing system or platform uses a shrink-wrapped OS, that platform may be unable to support runtime replacement of processors or memory modules. Some of the technical challenges associated with creating a platform that supports the runtime replacement of processors or memory modules while using a shrink-wrapped OS pertain to backward compatibility issues with legacy device drivers and applications.

BRIEF DESCRIPTION OF THE DRAWINGS

Features and advantages of the present invention will become apparent from the appended claims, the following detailed description of one or more example embodiments, and the corresponding figures in which:

DETAILED DESCRIPTION

This disclosure describes one or more methods and apparatus to enable runtime migration of processors and memory modules in an OS assisted manner, using processor, chipset, and memory controller extensions.

As used herein, the term "outgoing processor" refers to a processor that is to be replaced, and the term "spare processor" refers to a processor that will replace an outgoing processor. Similarly, the term "outgoing memory module" refers to a memory module that is to be replaced, and the term "spare memory module" refers to a memory module that will replace an outgoing memory module.

Currently, processor resources are exposed to device drivers and applications through OS application program interfaces (APIs) with processor affinity. Legacy applications and drivers directly control the thread scheduling and interrupt bindings to make use of these processor resources. Also, when working with a shrink-wrapped OS, device driers and applications can control the residency of physical pages, in order to interact with devices and perform direct memory access (DMA) operations on buffer memory using OS APIs. As a result, it may be impossible for a shrink-wrapped OS to remove any processor or memory resources without device driver and application support.

However, making all applications and drivers cognizant of the processor and memory removal events may require the development of new OS APIs and the rewriting of device drivers and applications. It could take many years to complete such efforts. Further, inherent limitations may prevent a shrink-wrapped OS from migrating some specific processor and memory resources, in spite of migration cognizant drivers and applications. Some examples are bootstrap processor and 16-bit DMA target memory (0-1 M).

Another potential alternative would be to create a hardware and/or firmware-based solution that enables processor and memory migration without OS support, making such CPU and memory removal events completely transparent to the OS, the device drivers, and the applications. However, such solutions would be very complex to design, and may not in fact be practicable to implement. Some of the complexity pertains to transferring all the architecturally visible CPU states from one processor to another in a way that is completely transparent to the OS, the device drivers, and the applications. Additional complexity pertains to handling device interrupts without losing them and redirect in-flight interrupt transitions from an outgoing processor to a spare processor during runtime. In addition, it may not even be possible to make processor migration completely transparent to the OS, the device drivers, and the applications due to the potential long latency of the migration process. For instance, blocking external interrupts for a long time may result in OS, device driver, and application failures, due to various timeout issues. For transparent memory migration, a full hardware copy engine may be very expensive to build, while firmware routines to copy contents of memory may result in very long latency for the whole memory migration process. This latency may create a visible performance impact to the OS and applications during the memory migration process.

This disclosure introduces a new way of implementing runtime replacement of processors and memory modules, for use in platforms that use shrink-wrapped OSs. For shrink-wrapped OS market segments, extensive re-writing of device drivers and applications seems an unacceptable proposition. The features described herein enable runtime replacement of processors and memory modules without the need for extensive re-writing of device drivers and applications.

In an example embodiment, the platform includes a small number of processor and/or platform hardware feature extensions, and migration is performed with OS assistance. For example, this disclosure describes a processor hardware extension for swapping non-writable architected states, as well as chipset and uncore-level extensions for re-dynamically programming the interrupt routing tables. The term "uncore" refers to components of a multi-core chip other than the cores (e.g., the interconnect for the cores, the bus interfaces, etc.) This disclosure also describes a new way of implementing the runtime replacement of memory modules for platforms that use shrink-wrapped OSs. Memory migration is performed with OS assistance. For example, migration may involve use of a memory controller extension that supports the mirror copy mode feature, such as the feature originally designed to support memory mirroring. The memory controller may be used to enable selective copying of data from one memory module to another.

Figure 1:
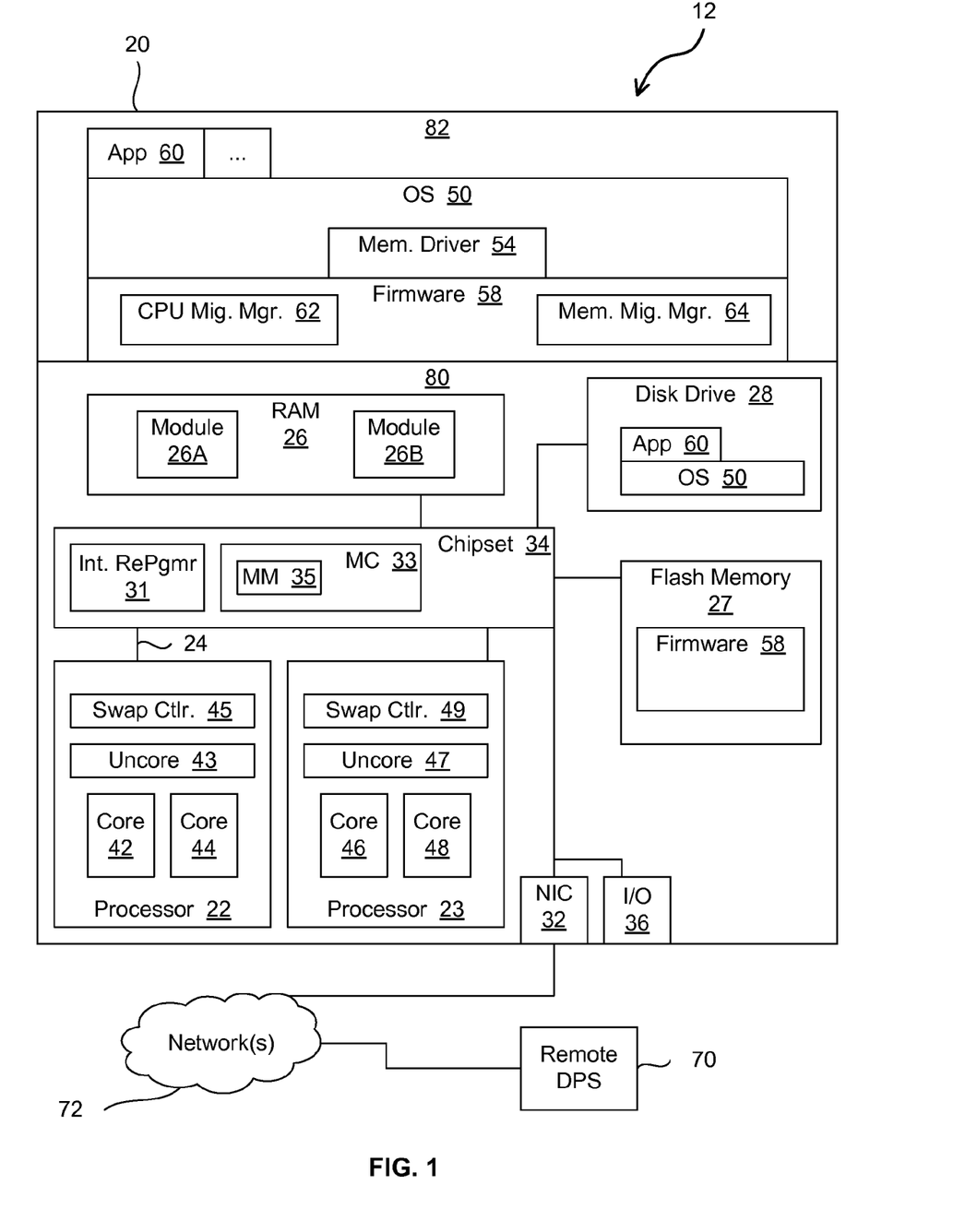
FIG. 1 is a block diagram depicting an example data processing environment.

FIG. 1 is a block diagram depicting an example data processing environment 12. Data processing environment 12 includes a local data processing system 20 that includes various hardware components 80 and software components 82.

The hardware components may include, for example, two or more processors or CPUs 22, 23 communicatively coupled to various other components via one or more system buses 24 or other communication pathways or mediums. As used herein, the term "bus" includes communication pathways that may be shared by more than two devices, as well as point-to-point pathways. Each CPU may include two or more processing units or cores, such as core 42, core 44, core 46, and core 48. Alternatively, a processing system may include one or more CPUs with a single processing core. The processing units may be implemented as processing cores, as Hyper-Threading (HT) technology, or as any other suitable technology for executing multiple threads simultaneously or substantially simultaneously.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols. Information on WiMAX protocols is currently available at grouper.ieee.org/groups/802/16/published.html.

Within processing system 20, processors 22 and 23 may be communicatively coupled to one or more volatile data storage devices, such as random access memory (RAM) 26, and to one or more nonvolatile data storage devices. In the example embodiment, the nonvolatile data storage devices include flash memory 27 and hard disk drive 28. In the embodiment of FIG. 1, RAM 26 consists of multiple memory modules, such as memory modules 26A and 26B.

In alternative embodiments, different numbers of memory modules may be used for RAM, and multiple nonvolatile memory devices and/or multiple disk drives may be used for nonvolatile storage. Suitable nonvolatile storage devices and/or media may include, without limitation, integrated drive electronics (IDE) and small computer system interface (SCSI) hard drives, optical storage, tapes, floppy disks, read-only memory (ROM), memory sticks, digital video disks (DVDS), biological storage, phase change memory (PCM), etc. As used herein, the term "nonvolatile storage" refers to disk drives, flash memory, and any other storage component that can retain data when the processing system is powered off. The term "nonvolatile memory" refers more specifically to memory devices (e.g., flash memory) that do not use rotating media but still can retain data when the processing system is powered off. The terms "flash memory" and "ROM" are used herein to refer broadly to nonvolatile memory devices such as erasable programmable ROM (EPROM), electrically erasable programmable ROM (EEPROM), flash ROM, etc.

Processors 22 and 23 may also be communicatively coupled to additional components, such as NIC 32, video controllers, IDE controllers, SCSI controllers, universal serial bus (USB) controllers, input/output (I/O) ports, input devices, output devices, etc. Processing system 20 may also include a chipset 34 with one or more bridges or hubs, such as a memory controller hub 33, an I/O controller hub, a PCI root bridge, etc., for communicatively coupling system components. Memory controller hub (MCH) 33 may also be referred to as memory controller (MC) 33.

Some components, such as NIC 32, for example, may be implemented as adapter cards with interfaces (e.g., a PCI connector) for communicating with a bus. Alternatively, NIC 32 and/or other devices may be implemented as embedded controllers, using components such as programmable or non-programmable logic devices or arrays, application-specific integrated circuits (ASICs), embedded computers, smart cards, etc. In alternative embodiments, processing systems may feature different numbers and/or combinations of cores, memory controllers, memory modules, etc.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing and/or transmitting information.

An embodiment of the invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. As used herein, the term "program" covers a broad range of software components and constructs, including applications, modules, drivers, routines, subprograms, methods, processes, threads, and other types of software components. Also, the term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 82. For instance, data storage device 28 and/or flash memory 27 may include various sets of instructions which, when executed, perform various operations. Such sets of instructions may be referred to in general as software.

As illustrated in FIG. 1, in the example embodiment, the programs or software components 82 may include system firmware 59, OS 50, and one or more applications 60. System firmware 58 may include boot firmware for managing the boot process, as well as runtime modules or instructions that can be executed after the OS boot code has been called. System firmware 58 may also be referred to as a basic input/output system (BIOS) 58.

In addition, firmware 58 includes CPU migration management software 62 and memory migration management software 64. CPU migration management software 62 may also be referred to as a CPU migration manager 62. Memory migration management software 64 may also be referred to as a memory migration manager 64. In the embodiment of FIG. 1, CPU migration manager 62 and a memory migration manager 64 are implemented as runtime modules of firmware 58.

As described in greater detail below, in the example embodiment, CPU migration manager 62 includes control logic to manage the entire flow of the CPU migration operations. In the example embodiment, CPU migration manager 62 runs at the highest privilege level (e.g., in ring 0). In alternative embodiments, CPU migration managers may be implemented partially or completely outside of the system firmware. For instance, the control logic may be implemented entirely in an OS, with device driver components; the control logic may be split between the firmware and the OS by dividing roles and responsibilities; etc.

As described in greater detail below, memory migration manager 64 includes control logic to manage the entire flow of the memory migration operations. In the example embodiment, memory migration manager 62 runs at the highest privilege level (e.g., in ring 0, in a system management interrupt (SMI) context, etc.) from a platform management stack within system firmware 58. In alternative embodiments, memory migration managers may be implemented partially or completely outside of the system firmware. For instance, the control logic may be implemented entirely in an OS, with device driver components. Alternatively, the control logic may also reside partially in one or more application agents. Alternatively, the control logic may be split between the firmware and the OS by dividing roles and responsibilities.

In the example embodiment, processing system 20 is configured to use CPU 22 as the active processor and CPU 23 as the spare or backup processor. As indicated above, when the active processor needs to be sapped out, the active processor may be referred to as the outgoing processor.

As indicated above, CPU 22 includes processing core 42 and processing core 44, while CPU 23 includes processing core 46 and processing core 48. In addition to processing cores, CPU 22 includes an uncore 43 and a swap controller 45. Likewise, CPU 23 includes an uncore 47 and a swap controller 49. Swap controllers 45 and 49 are implemented as control logic in the processor hardware that allow CPU migration manager 62 to store, in the CPUs, state data that would be substantially non-writeable in a conventional processor. For instance, CPU migration manager 62 can use swap controller 45 to swap substantially non-writable architected states which are visible to device drivers and applications between outgoing and spare processors.

An instance of a substantially non-writable architected state is the initial advanced programmable interface controller (APIC) identifier (ID) state in processors that support the x86 architecture. In such a processor, the initial APIC ID value is retrievable through use of the CPUID instruction, with the EAX register set to 1 (EAX=1). In particular, as explained on page 3 of the article entitled "Methods to Utilize Intel's Hyper-Threading Technology with Linux*":

Each logical processor has a unique Advanced Programmable Interface Controller (APIC) ID. The APIC ID is initially assigned by the hardware at system reset and can be later reprogrammed by the BIOS or the operating system. On a processor that supports HT Technology, the CPUID instruction also provides the initial APIC ID for a logical processor prior to any changes by the BIOS or operating system.

Thus, a processor may actually store two APIC IDs. One is the "initial APIC ID", and it can always be retrieved with the CPUID instruction. Accordingly, the initial APIC ID is considered substantially non-writeable. The OS, applications, and device drivers rely on the initial APIC ID value to detect the CPU topology information including core-to-package and thread-to-core relationships, and they typically use this information for optimizing the software performance and implementing the multi-core licensing policy.

The other APIC ID, referred to herein as the "current APIC ID," can be "later reprogrammed by the BIOS or the operating system," as indicated above. However, even if the BIOS or the OS can reprogram the current APIC ID, in practice it cannot be written with an arbitrary value. Whether the current APIC ID can be written may be model specific. The current APIC ID value is also used by the platform for performing proper routing of the interrupts, and changing the value requires the interrupt routing table on the chipset or uncore to be reprogrammed. Therefore, the current APIC ID should only be modified by the interrupt reprogrammer and the uncore, as described in greater detail below with regard to block 136 in FIG. 2. For instance, the Intel 64 and IA-32 Architecture Software Developers Manual (SDM), Vol. 3A, section 8.4.6 (Local APIC) states the following:

In MP systems, the local APIC ID is also used as a processor ID by the BIOS and the operating system. Some processors permit software to modify the APIC ID. However, the ability of software to modify the APIC ID is processor model specific. Because of this, operating system software should avoid writing to the local APIC ID register.

Other embodiments may involve Intel Itanium processors, which use a local ID (LID) register that serves the same purpose and has the same restrictions.

In the example embodiment, swap controllers 45 and 49 make it possible to update the initial APIC IDs for processors 22 and 23, respectively. For instance, swap controller 45 may provide an interface to a machine specific register (MSR) in processor 22 to hold the initial APIC ID value that will be reported in response to the CPUID instruction executed with EAX=1. In one embodiment, the interfaces provided by swap controllers 45 and 49 are readable and writable by CPU migration manager 62. Accordingly, such an interface may be referred to as a non-writeable state migration interface.

Additional substantially non-writable state values that a CPU migration manager may update through an interface such as that provided by swap controller 45 or 49 may include, without limitation, current APIC ID, ⌐D, interrupt status, model specific registers (MSRs), etc.

In the embodiment of FIG. 1, chipset 34 includes an interrupt reprogrammer 31. Interrupt reprogrammer 31 serves a platform processor function to reprogram interrupt routing tables dynamically. Uncores 43 and 45 may also include control logic for dynamically reprogramming interrupt routing tables.

A typical multi-processor or multi-core platform typically includes interrupt routing table logic to route external interrupts to correct processor destinations. Dynamic re-programmability of the interrupt routing table logic enables re-routing of external interrupts from outgoing processors to spare processors for the CPU migration. This interrupt routing reprogramming function can be implemented at the chipset and processor's uncore levels and can be exposed to the migration management software through chipset registers and processor's uncore registers. An interface for such communications may be referred to as an interrupt migration interface. In one embodiment, the interrupt migration interface may be implemented with a firmware API.

OS 50 includes control logic to stop or pause processor and device activities including interrupt transactions during a migration operation. In particular, OS 50 stops or pauses processor activity by freezing the OS thread scheduler and putting the processors in the idle state, and OS 50 stops or pauses device activity by stopping device functions including the DMA and interrupt transactions. In one embodiment, the OS uses more or less conventional sleep functionality (e.g., system hibernation) to pause the processor and device activities.

The interface that CPU migration manager 62 uses to instruct OS 50 to pause processor and device activities prior to CPU migration may be referred to as a system pause interface. In one embodiment, the system pause interface may be implemented using a more or less conventional Advanced Configuration and Power Interface (ACPI) notification mechanism, which may be invoked directly from platform firmware 58. Additional details about ACPI may be obtained from the Advanced Configuration And Power Interface Specification, Revision 3.0b, dated Oct. 10, 2006. An alternative implementation may define a new OS API to allow applications or device drivers to initiate this operating system request.

As indicated above, CPU migration manager 62 manages the flow of the CPU migration operations. An instance of this software component may also interact with an out-of-band platform management software stack. As described in greater detail below, when it is driving the CPU migration flow, CPU migration manager 62 invokes the non-writable state migration interface (NWSMI), the interrupt migration interface, and the system pause interface, and may interact with swap controllers 45 and 49, with interrupt reprogrammer 31, and with OS 50.

Figure 2:
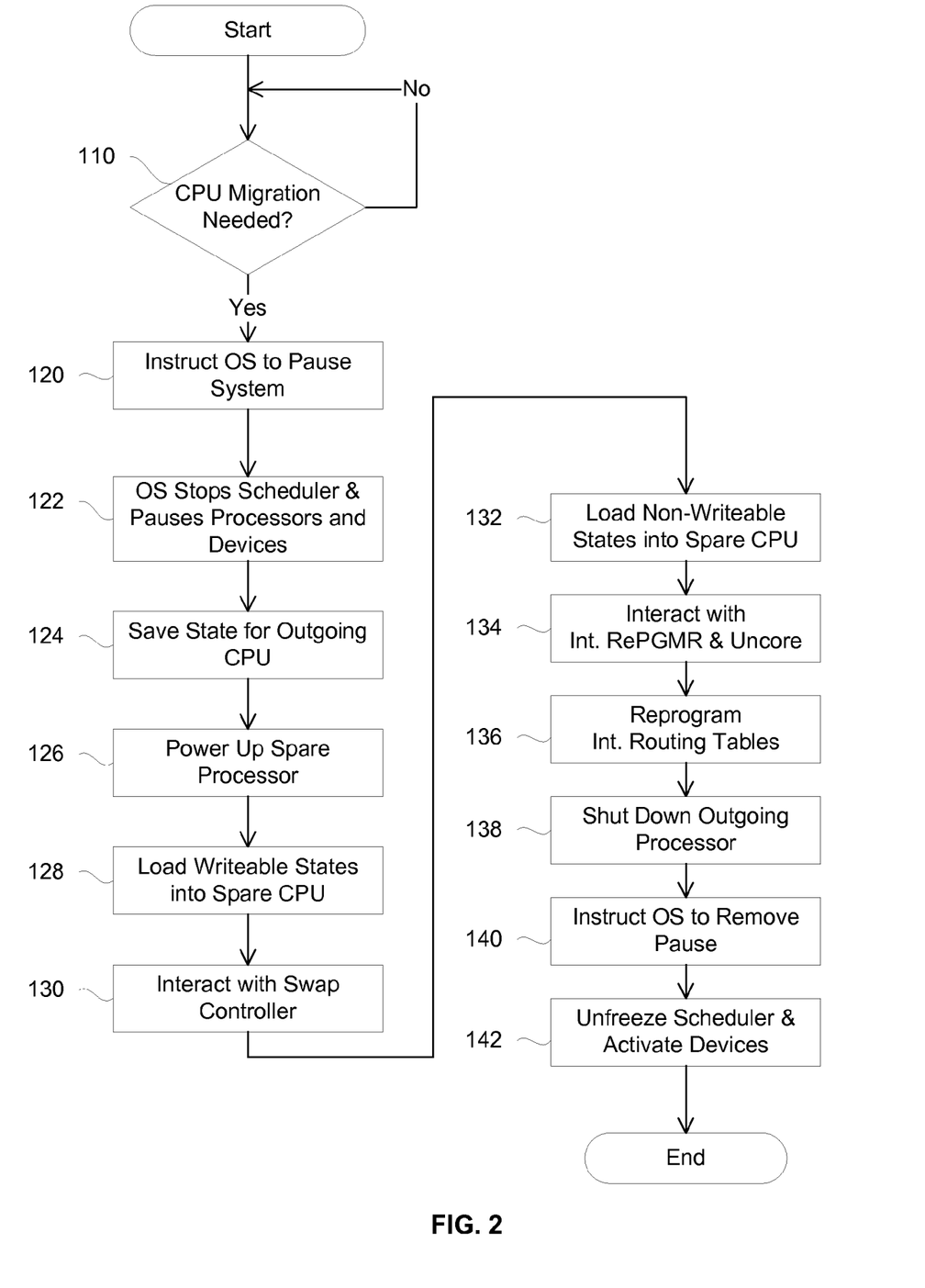
FIGS. 2 and 3 are flowcharts depicting various aspects of example processes for supporting runtime migration of processors and/or memory modules in the processing system of FIG. 1.

FIG. 2 depicts an example process for supporting runtime migration of processors in the processing system of FIG. 1. The illustrated process begins after processing system 20 has booted and been configured to use CPU 22 as the active or primary processor and CPU 23 as the spare processor.

Block 110 depicts CPU migration manager 62 determining the need for CPU migration, for instance in response to detecting a failing CPU component in CPU 22. Once the decision is made for the CPU migration, CPU migration manager 62 instructs OS 50, through the system pause interface, to pause or stop all processor and device activities. As shown at block 120, in response to the request from CPU migration manager 62, OS 50 freezes the OS scheduler and puts all processors on the system into the idle state. OS 50 also puts all devices in inactive state, disabling device interrupt transactions. This step ensures that CPU migration manager 62 can safely swap the state of the CPU between the outgoing and the spare processors. This step also prevents any processors from generating inter-processor interrupts (IPIs), and it prevents devices from generating external interrupts during the migration.

As shown at block 124, after OS 50 freezes the processor and device activities, CPU migration manager 62 saves away the contents of the architectural and potentially machine-specific CPU states for the outgoing processor, including writable and non-writable processor states needing to be transferred, into a non-paged memory location. However, in alternative embodiments, alternative storage areas (e.g., cache memory nonvolatile (NV) RAM, etc.) may be used as temporary storage for the state data.

As indicated at block 126, CPU migration manager 62 then on-lines and brings up spare processor 23, to prepare for swapping the CPU state from outgoing processor 22 to spare processor 23. The operations associated with block 126 may include initializing spare processor 23 to a known state, including initializing states of machine specific registers with help from platform firmware 58. In an alternative embodiment, the CPU migration manager may bring up the spare processor before saving the CPU states of the outgoing processor.

After spare processor 23 is on line, CPU migration manager 62 then swaps the architecturally writable contents of the CPU states into spare processor 23, by restoring the previously saved writable CPU states of outgoing processor 22, as shown at block 128. Also, as shown at block 130, CPU migration manager 62 invokes the NWSMI for processor 23, to instruct swap controller 49 to load the saved state into spare processor 23. In response to that request, swap controller 49 loads into spare processor 23 the non-writable architected CPU states that were previously saved from outgoing processor 22, as shown at block 132. Since these are non-writable, swap controller 49 may need to provide a special interface to modify the non-writable CPU state. In one embodiment, the implementation for this interface may use MSRs in processor 23 to access and modify non-writable processor CPU state.

Then, as shown at block 134, CPU migration manager 62 uses the interrupt migration interface to instruct interrupt reprogrammer 31 and uncore 47 to modify the interrupt routing table logic in chipset 34 and processor 23. In response to that request, interrupt reprogrammer 31 and uncore 47 dynamically reprogram the necessary routing tables to correctly direct external interrupts to spare processor 23, as depicted at block 136. As shown at block 138, CPU migration manager 62 may then off-line outgoing processor 22 with help from platform firmware 58.

As shown at block 140, CPU migration manager 62 then notifies OS 50 of the completion of the CPU migration flow through the system pause interface. In one embodiment, the implementation for this interface may use an ACPI notification mechanism. In another embodiment, the CPU migration manager may simply use an OS API to interface with the OS. In response to the unpause or resume request, OS 50 activates the devices including the external interrupt transactions and unfreezes the OS scheduler to start utilizing spare processor 23, as shown at block 142.

Figure 3:
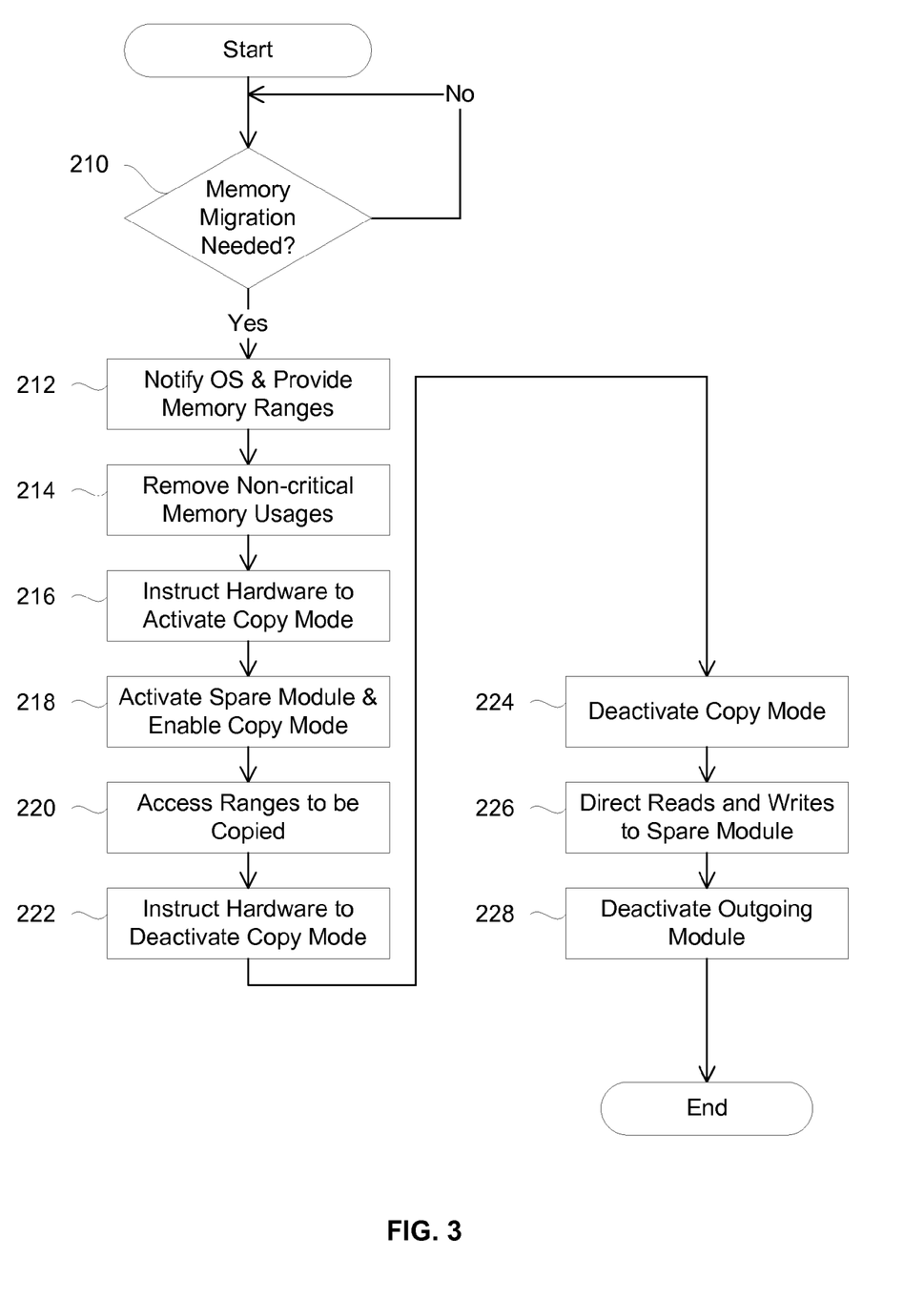

FIG. 3 depicts an example process for supporting runtime migration of memory modules in the processing system of FIG. 1. The illustrated process begins after processing system 20 has booted and been configured to use memory module 26A as an active or primary memory module and memory module 26B as a spare memory module. Block 210 depicts memory migration manager 64 determining the need for memory migration, for instance in response to detecting that memory module 26A is failing.

As illustrated in FIG. 1 memory controller 33 includes a mirror module 35. In various embodiments, the mirror module may be configurable to mirror only writes, or to mirror reads and writes. In some embodiments, the memory controller may use a conventional mirror module to support memory mirroring in a memory migration solution that uses help from the operating system. In some embodiments, the memory controller and/or other components may be integrated into the CPU.

The mirror copy mode of mirror module 35 may be enabled and disabled through an interface to the system software (e.g., OS 50). This interface may be referred to as a mirror mode selection interface. In one embodiment, the mirror mode selection interface is implemented using memory or I/O mapped memory device registers. In another embodiment, the mirror mode selection interface may be implemented differently, such as through abstraction into a higher level interface, such as an ACPI method or a firmware API.

When the mirror copy mode is enabled, the spare memory module is activated and the memory contents are forwarded from the outgoing memory module to the spare memory module for every read operation. Also, every write goes to both the outgoing and spare memory modules when the mirror copy mode is enabled. Once the spare memory module has received the necessary data, mirror copy mode is disabled, the outgoing memory module is deactivated, and the memory decoders are reprogrammed to make memory writes and reads go directly to the spare memory module.

In alternative embodiments, other mirroring techniques may be used. For instance, one embodiment may include copy hardware based on write copy, and another embodiment may use hardware to fully automate the copy function without using any software.

In the example embodiment, OS 50 also participates in the memory migration process. For instance, OS 50 may remove the memory usage of the paged memory ranges and may provide memory read operations for the memory ranges that need to be migrated. An implementation may choose to implement this operating system function with help from device driver modules, such as a memory driver 54, as shown in FIG. 1.

As indicated at block 212 of FIG. 3, once the decision is made for memory migration, memory migration manager 64 notifies OS 50 of the need of memory migration, and specifies the memory ranges that need to be migrated (e.g., the memory ranges residing on outgoing memory module 26A). In one embodiment, the memory migration manager utilizes an ACPI mechanism to notify the OS of the need for memory migration and to communicate what memory ranges need to be migrated. Another implementation may define an API between the memory migration manager and the operating system for this purpose.

OS 50 then determines which of the specified memory ranges actually need to be migrated, and which memory ranges can simply be removed from usage by the operating system, device drivers, and applications, as shown at block 214. For instance, OS 50 may remove usages of free memory pool page ranges and non-dirty page-able memory ranges to reduce the amount of data that needs to be migrated. In one embodiment, OS 50 removes such usages by implementing such logic into the virtual memory management algorithm of its memory manager. For instance, in the example embodiment, OS 50 has a memory manager for maintaining a database to keep track of what memory ranges are free to be allocated (free memory pool rages) and what memory ranges have already copied contents on the disk ((non-dirty page-able memory ranges). By inspecting this database, OS 50 can determine which memory ranges have no memory contents to be preserved and do not need to be migrated.

As depicted at block 216, OS 50 may then invoke the mirror mode selection interface to activate the mirror copy mode function of mirror module 35 in memory controller 33. Memory controller 33 then activates spare memory module 26B and enables the code mode of mirror module 35 for forwarding memory contents from outgoing memory module 26A to spare memory module 268. As shown at block 220, OS 50 then selectively reads the memory ranges with data that needs to be copied from outgoing memory module 26A to spare memory module 26B. However, for a processor that has internal cache, read operations from the mirror module may not necessarily detect data that is already cached. Therefore, cache flush operations may be used prior to the read operations described above, to make the necessary memory data visible to the mirror module.

Alternatively, if the mirroring configuration does not mirror both memory reads and writes, but only mirrors writes, the OS may need to perform memory read followed by memory write operations. More specifically, the OS may need to utilize an atomic read and write instruction, to avoid race conditions with agents (e.g., CPU or DMA) that may access the same memory address at the same time. Alternatively, the control logic to stop or pause processor and device activities used for the processor migration can be used to eliminate this race condition. For purposes of this disclosure, to "access" memory means to read from memory or to write to memory.

Referring again to the embodiment of FIG. 3, as depicted at block 222, after OS 50 has read the necessary memory locations to cause mirror module 35 to migrate the data in those memory ranges, OS 50 invokes the mirror mode selection interface to notify memory controller 33 that memory migration operations have been completed. As shown at block 224, memory controller 33 then deactivates the memory mirror copy mode. Memory controller 33 then reprograms the memory decoders to make memory writes and reads go directly to the spare memory module, as shown at block 226. Memory controller 33 also disables outgoing memory module 26A, as shown at block 228.

Outgoing memory module 26A can then be off-lined, taken out, and possibly replaced. Memory usage may then be migrated back to the new memory module by memory migration manager 64.

Thus, CPUs and memory modules may be replaced in a processing system with a shrink-wrapped OS without performing a system shutdown. Furthermore, runtime CPU and memory module replacement can be supported without requiring development of new device drivers and applications with new OS APIs. Consequently the platform need not lose backward compatibility with existing device drivers and applications.

In addition, the platform can provide for runtime memory module replacement without using full memory mirroring. Full memory mirroring is an expensive approach that requires entire memory modules to be paired with mirror memory modules all the time. Full mirroring may also adversely affect memory performance.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternate embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for switching to a spare processor during runtime, the method comprising:
   determining that execution should be migrated off of an active processor in a processing, system;
   after determining that execution should be migrated off of the active processor, pausing an operating system (OS) scheduler in the processing system, pausing at least one device in the processing system, and putting the active processor into an idle state;
   saving state data from writable and non-writable stores in the active processor to at least a store outside of the active processor;
   starting a spare processor in the processing system;
   loading the saved state data to the spare processor;
   reprogramming interrupt routing table logic for the processing system to direct external interrupts to the spare processor;
   off-lining the active processor;
   resuming the device;
   resuming the OS scheduler; and
   dispatching threads to the spare processor for execution,
   wherein an internal cache of the active processor is to be flushed prior to the off-lining of the active processor to make data stored in the internal cache visible to a memory mirror module and
   wherein an operating system (OS) selectively reads a memory range with data that needs to be copied from an outgoing memory module of the active processor to a spare memory module of the spare processor by the memory mirror module.

2. A method according to claim 1, wherein the operation of determining that execution should be migrated off of the active processor is performed by system firmware in the processing system.

3. A method according to claim 2, further comprising:
   sending a pause request from the system firmware to the OS in response to determining that execution should be migrated off of the active processor.

4. A method according to claim 3, further comprising:
   receiving a resume request from the system firmware at the OS; and
   resuming the device in response to the receiving the resume request from the system firmware.

5. A method according to claim 3, further comprising:
   putting all active processors in the processing system into an idle state, and pausing all devices in the processing system, before loading the state data from the non-writeable store of active processor into the spare processor.

6. A method according to claim 1, wherein the operation of saving state data from writable and non-writable stores in the active processor is performed after the active processor has entered the idle state.

7. A method according to claim 1, wherein the operation of reprogramming interrupt routing table logic for the processing system comprises:
   reprogramming interrupt routing table logic in a chipset of the processing system; and
   reprogramming interrupt routing table logic in an uncore of the spare processor.

8. A method according to claim 1, further comprising:
   after resuming the OS scheduler, dispatching threads to the spare processor for execution.

9. A method according to claim 1, wherein the memory mirror module is to mirror only write operations or to mirror both read and write operations.

10. A method according to claim 1, wherein the memory mirror module is to copy at least some data from one memory module to another memory module.

11. A method according to claim 1, wherein the memory mirror module is to mirror data in response to an interface to the OS.

12. A processing system that can switch to a spare processor during runtime, the processing system comprising:

a first processor to serve as an active processor operable to execute an operating system (OS);
a second processor to serve as a spare processor;
at least one device;
data storage;
one or more communication pathways in communication with the first processor, the second processor, the device, and the data storage;
control logic stored at least partially in the data storage, the control logic operable to perform operations comprising:
determining that execution should be migrated off of the active processor;
after determining that execution should be migrated off of the active processor, pausing a scheduler in the OS, pausing the device, and putting the active processor into an idle state;
saving state data from writable and non-writable stores in the active processor, to at least a store outside of the active processor;
starting the spare processor;
loading the saved state data to the spare processor;
reprogramming interrupt routing table logic for the processing system to direct external interrupts to the spare processor;
off-lining the active processor;
unpausing the device;
unpausing the OS scheduler; and
dispatching threads to the spare processor for execution,
wherein an internal cache of the active processor is to be flushed prior to the off-lining of the active processor to make data stored in the internal cache visible to a memory mirror module and wherein an operating system (OS) selectively reads a memory range with data that needs to be copied from an outgoing memory module of the active processor to a spare memory module of the spare processor by the memory mirror module.

13. A processing system according to claim 12, further comprising:
the OS scheduler operable to dispatch threads to the spare processor for execution after the OS scheduler has been resumed.

14. A processing system according to claim 12, wherein at least a portion of the control logic comprises system firmware.

15. A processing system according to claim 12, further comprising the control logic operable to perform operations comprising:
sending a pause request to the OS in response to determining that execution should be migrated off of the active processor.

16. A processing system according to claim 12, further comprising the control logic operable to perform operations comprising:
saving the state data after the active processor has entered the idle state.

17. A processing system according to claim 12, further comprising the control logic operable to perform operations comprising:
putting all active processors in the processing system into an idle state, and pausing all devices in the processing system, before loading the state data from the non-writeable store of active processor into the spare processor.

18. A processing system according to claim 12, further comprising:
a chipset in communication with at least one of the communication pathways, the chipset to contain interrupt routing table logic; and
an uncore in the spare processor, the uncore to contain interrupt routing table logic;
the control logic to reprogram interrupt routing table logic for the processing system to direct external interrupts to the spare processor by reprogramming the interrupt routing table logic in the chipset and the interrupt routing table logic in the uncore of the spare processor.

19. An apparatus, comprising:
a non-transitory machine-accessible medium; and
instructions in the non-transitory machine-accessible medium, wherein the instructions, when executed by a processing system having an active processor and a spare processor, cause the processing system to perform operations comprising:
determining that execution should be migrated off of the active processor; after determining that execution should be migrated off of the active processor, pausing an operating system (OS) scheduler in the processing system, pausing at least one device in the processing system, and putting the active processor into an idle state;
saving state data from writable and non-writable stores in the active processor, to at least a store outside of the active processor;
starting the spare processor;
loading the saved state data to the spare processor;
reprogramming interrupt routing table logic for the processing system to direct external interrupts to the spare processor;
off-lining the active processor;
resuming the device;
resuming the OS scheduler; and
dispatching threads to the spare processor for execution,
wherein an internal cache of the active processor is to be flushed prior to the off-lining of the active processor to make data stored in the internal cache visible to a memory mirror module and wherein an operating system (OS) selectively reads a memory range with data that needs to be copied from an outgoing memory module of the active processor to a spare memory module of the spare processor by the memory mirror module.

20. An apparatus according to claim 19, wherein at least a portion of the instructions comprises system firmware.

21. An apparatus according to claim 19, wherein the instructions send a pause request to the OS in response to determining that execution should be migrated off of the active processor.

22. An apparatus according to claim 19, wherein the instructions cause the processing system to save the state data after the active processor has entered the idle state.

23. An apparatus according to claim 19, wherein the instructions cause the processing system to reprogram interrupt routing table logic for the processing system to direct external interrupts to the spare processor by (a) reprogramming interrupt routing table logic in a chipset of the processing system and (b) reprogramming interrupt routing table logic in an uncore of the spare processor.

* * * * *

UNITED STATES PATENT AND TRADEMARK OFFICE
CERTIFICATE OF CORRECTION

| | | |
|---|---|---|
| PATENT NO. | : 8,296,768 B2 | Page 1 of 1 |
| APPLICATION NO. | : 11/772155 | |
| DATED | : October 23, 2012 | |
| INVENTOR(S) | : Koichi Yamada et al. | |

It is certified that error appears in the above-identified patent and that said Letters Patent is hereby corrected as shown below:

On the cover page, item (56), in column 2, under "Other Publications", line 4, delete "Instructon:" and insert -- Instruction: --, therefor.

On the cover page, item (57), in column 2, in "Abstract", line 6, delete "substantial" and insert -- substantially --, therefor.

Signed and Sealed this
Twelfth Day of February, 2013

Teresa Stanek Rea
*Acting Director of the United States Patent and Trademark Office*